US012548786B2

(12) United States Patent
D'Anzi et al.

(10) Patent No.: US 12,548,786 B2
(45) Date of Patent: Feb. 10, 2026

(54) RECIRCULATION SYSTEM AND SUPPLY SYSTEM COMPRISING SAID SYSTEM

(71) Applicant: ARCO FUEL CELLS S.R.L., Medicina (IT)

(72) Inventors: Angelo D'Anzi, Medicina (IT); Pietro Mandurino, Bologna (IT)

(73) Assignee: ARCO FUEL CELLS S.R.L., Medicina (IT)

( * ) Notice: Subject to any disclaimer, the term of this patent is extended or adjusted under 35 U.S.C. 154(b) by 444 days.

(21) Appl. No.: 17/792,654

(22) PCT Filed: Feb. 4, 2021

(86) PCT No.: PCT/IB2021/050899
§ 371 (c)(1),
(2) Date: Jul. 13, 2022

(87) PCT Pub. No.: WO2021/156781
PCT Pub. Date: Aug. 12, 2021

(65) Prior Publication Data
US 2023/0051038 A1    Feb. 16, 2023

(30) Foreign Application Priority Data
Feb. 5, 2020    (IT) .................. 102020000002239

(51) Int. Cl.
*H01M 8/04089*    (2016.01)
*H01M 8/04082*    (2016.01)
(Continued)

(52) U.S. Cl.
CPC ... *H01M 8/04097* (2013.01); *H01M 8/04201* (2013.01); *H01M 8/04388* (2013.01);
(Continued)

(58) Field of Classification Search
CPC .................. H01M 8/04201; H01M 8/04097
See application file for complete search history.

(56) References Cited

U.S. PATENT DOCUMENTS 8,557,455 B2 * 10/2013 Wahlmuller ...... H01M 8/04097
429/415
8,672,643 B2 *  3/2014 Gurin ................ H01M 8/04097
417/166
(Continued)

FOREIGN PATENT DOCUMENTS

CN        114824364 A  *  7/2022  ........ H01M 8/04104
DE    102016110452 A1  * 12/2017
(Continued)

OTHER PUBLICATIONS

International Search Report and Written Opinion dated May 7, 2021 from counterpart International Patent Application No. PCT/IB2021/050899.
(Continued)

*Primary Examiner* — Amanda C. Walke
(74) *Attorney, Agent, or Firm* — SHUTTLEWORTH & INGERSOLL, PLC; Timothy J. Klima

(57) ABSTRACT

System for recirculating hydrogen in a fuel cell including a tank having an inlet connectable to an outlet of the fuel cell and an outlet connectable to a line for feeding hydrogen to the fuel cell; the recirculation system includes a first check valve and a second check valve; the first check valve can be inserted between the outlet of the fuel cell and the inlet of the tank, for adjusting a flow from the fuel cell to the tank whilst the second check valve can be inserted between the outlet of the tank and the hydrogen feed line, for adjusting a flow of hydrogen from the tank to the feed line.

16 Claims, 1 Drawing Sheet

(51) Int. Cl.
*H01M 8/0438* (2016.01)
*H01M 8/04492* (2016.01)
*H01M 8/04537* (2016.01)
*H01M 8/04746* (2016.01)
*H01M 8/04828* (2016.01)

(52) U.S. Cl.
CPC ... *H01M 8/04402* (2013.01); *H01M 8/04492* (2013.01); *H01M 8/04559* (2013.01); *H01M 8/04753* (2013.01); *H01M 8/04828* (2013.01)

(56) References Cited

U.S. PATENT DOCUMENTS

| | | |
|---|---|---|
| 9,419,292 B2 * | 8/2016 | Cherchi ............ H01M 8/04589 |
| 2005/0142400 A1 | 6/2005 | Turco et al. |
| 2008/0187793 A1 | 8/2008 | Owejan et al. |
| 2009/0104478 A1 | 4/2009 | Wahlmuller et al. |

FOREIGN PATENT DOCUMENTS

| | | | |
|---|---|---|---|
| JP | 2008177128 A | | 7/2008 |
| JP | 2008300057 A | | 12/2008 |
| JP | 2010186702 A | | 8/2010 |
| JP | 2011113859 A | | 6/2011 |
| KR | 101601325 B1 * | | 3/2016 |

OTHER PUBLICATIONS

Japanese Office Action dated Jan. 14, 2025 from counterpart Japanese App No. 2022-5467681.

* cited by examiner

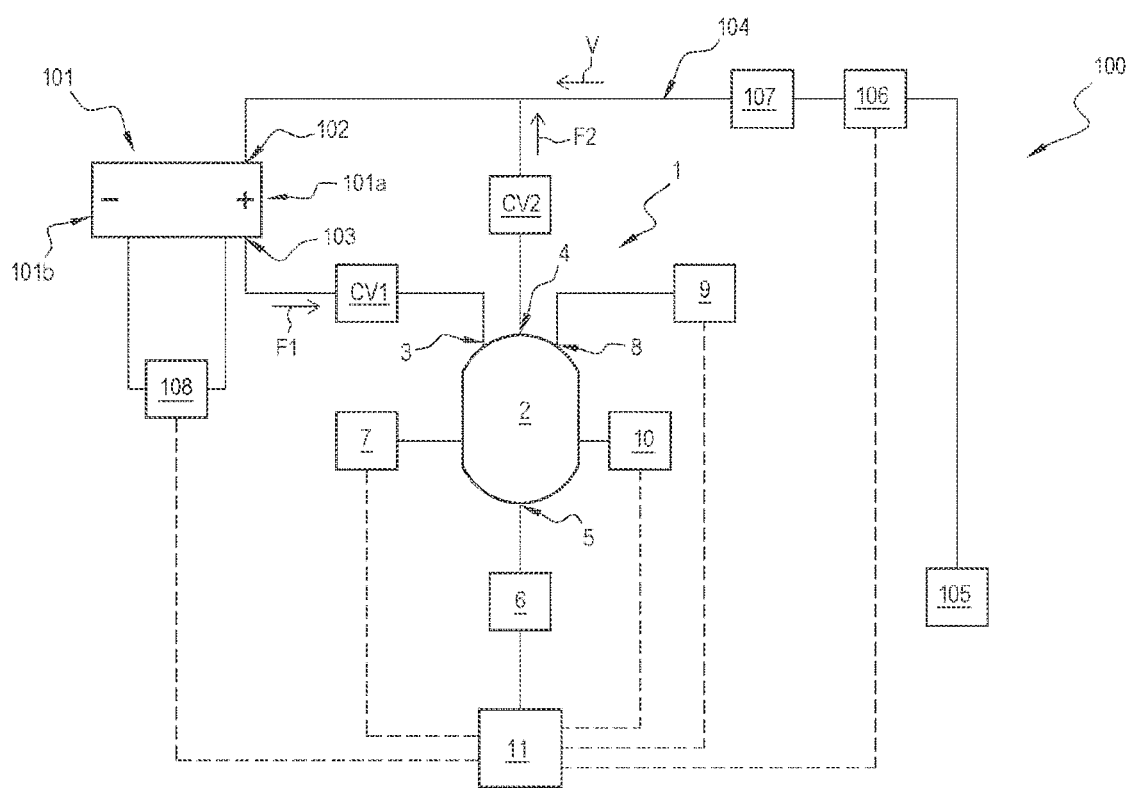

RECIRCULATION SYSTEM AND SUPPLY SYSTEM COMPRISING SAID SYSTEM

This application is the National Phase of International Application PCT/IB2021/050899 filed Feb. 4, 2021 which designated the U.S.

This application claims priority to Italian Patent Application No. 102020000002239 filed Feb. 5, 2020, which application is incorporated by reference herein.

TECHNICAL FIELD

This invention relates to a recirculation system and in particular a system for recirculating hydrogen for an electricity generating plant based on fuel cells, suitable for the charging of batteries, for example lithium batteries; the invention also relates to a plant for generating electricity comprising the recirculation system.

BACKGROUND ART

The fuel cell is a special device designed to generate electricity by directly combining hydrogen and oxygen. These two reactants are suitably conveyed into a stack of fuel cells, that is to say, into a series of plates made of suitable material separated by a suitable catalysing membrane.

Each membrane is combined with a so-called Gas Diffusion Layer (GDL) which acts basically as an electrode and facilitates the diffusion of reactants through the membrane.

The reactants, flowing inside suitable flow channels made on the surfaces of the plates, each on one side, cathode or anode, of the catalysing membrane, combine in such a way as to generate, as a by-product of the reaction, simple water vapour and a flow of electrons which is an electric current.

In addition to the stack of basic cells, the fuel cell in its entirety also comprises the so-called BOP (balance of plant) which in turn consists of a set of devices, necessary for the correct operation of the fuel cell, such as, for example, a blower for blowing air inside the stack, a series of valves for hydrogen, valves and conduits for the cooling water.

During the typical operation of the fuel cell, hydrogen is sent on the anode side of the basic cell or of the stack from where, thanks to the catalytic action of the membrane, a proton migrates, through the membrane itself, to combine with the oxygen present on the cathode side thereby forming water vapour which accumulates on the cathode side of the cell. The presence of water inside the stack is essential for the correct operation of the fuel cell. In particular, both the catalytic membrane and the gas diffusion layer must be sufficiently moist for the reaction.

In order to guarantee the necessary humidity in the stack, suitable systems are used, which include the recirculation of the water accumulated to the cathode or direct refilling of water from an external reserve, or also the humidification of the gaseous reactants such as, for example, a humidifier which draws moisture from the cathode flow coming from the fuel cell and transferring it to the dry one coming from the blower; the quantity of water in the cell must, however, remain within a certain interval and must not be excessive.

The presence of large quantities of water inside the cell may in fact cause the so-called "flooding", that is to say, an excessive accumulation of water which can inhibit the correct reaction and therefore the operation of the fuel cell; all excess water in the cell must be suitably purged, both on the anode side and on the cathode side.

A possible greater quantity of water in the cell forms, preferably, where the hydrogen and the oxygen react, that is to say, on the cathode side, however a certain quantity of water can also move on the anode side of the cell where only hydrogen is present.

The air which flows in the cathode side of the stack to provide the oxygen necessary for the reaction is typically introduced by means of a suitable fan or compressor which is able to generate a sufficient pressure to remove any excess water, in a suitable and quite natural manner, as part of the operation itself.

On the other hand, on the anode side, hydrogen is present in a static manner and under pressure, so the water on the anode side can only accumulate in a gradually increasing manner.

Opportune and repeated purging operations on the anode side are therefore necessary to allow the discharge of excess water and the correct operation of the fuel cell; in order to carry out these purges on the anode side, the fuel cells are equipped with a dedicated purging valve which can, for example, be opened periodically.

This necessary and non-avoidable purging operation, performed on all the basic cells, has several significant drawbacks.

Typically, the loss of overall efficiency of a fuel cell, due to anode purging operations and management of the hydrogen, reaches up to 15% or even more, which are quite significant values especially for high efficiency systems such as fuel cell systems.

Considering that the hydrogen is constantly under pressure on the anode side, the opening of the above-mentioned purging valve causes a sudden pressure drop and a flow of hydrogen which escapes from the stack, dragging with it the water present on the anode side.

The purging operation, besides taking away the water, however takes away significant quantities of hydrogen which are lost for the purposes of the reaction, with negative affects on the efficiency of the cell. Since hydrogen is the least dense gas and element in nature, even small and short purges can therefore determine significant amounts of lost hydrogen.

Moreover, the hydrogen introduced towards the outside and in closed environments must be further diluted in order to contain the concentration below the flammability limits according to the regulations and it must therefore be diluted with a suitable flow of air at its outlet from the purging valve.

Moreover, considering that the purging must be carried out forcedly towards an environment with a lower pressure, typically at ambient pressure, compared with that of normal operation of the stack, in order to avoid losses, that is to say, if it is desired or necessary to recover the purged hydrogen, it is normally necessary to use a specific compressor for hydrogen which recompresses the purged hydrogen to a pressure value greater than that of normal operation of the cell and returns it into circulation in the system.

This solution has significant impacts in terms of costs and efficiency due, mainly, to the relatively high cost of a hydrogen compressor and the energy needed for its operation, which is absorbed by the fuel cell; it might even be preferable to lose the purging hydrogen rather than returning it to the system.

In the case of considerable power outputs, in the order of thousands or tens of thousands of watts, the complexity of such a device increases the costs of the cell to extremely large amounts, in the order of thousands or tens of thousands of euros, and even puts the application outside of the market if the quantity of hydrogen to be recirculated becomes significant for the system.

Patent document US2009104478A1 illustrates an alternative solution to the use of the compressor to control, in particular, the pressure in the anode of a fuel cell and, at the same time, obtain a recirculation of hydrogen.

The water and the gas located on the anode side are periodically discharged from the anode through a solenoid valve 34 served by a control unit 38 which operates it periodically, and collected and separated in a storage tank.

The portion of gas is then fed again from the tank to the anode by means of a solenoid valve 37, which is also controlled by the control unit 38.

The control unit 38 also controls a solenoid valve 33 for supplying hydrogen to the cell in such a way that the main pressure in the tank 30 is adjusted until it reaches a desired value; the control unit 38, suitably controlling, amongst other things, the solenoid valves 33 and 37, keeps the pressure in the anode adjusted to a desired preset value.

The system of patent document US2009104478A1, to control the pressure and, more generally, recirculate the hydrogen, requires very sophisticated electronics to control the solenoid valves in a suitable manner and with specific times.

The pressure is controlled in the separate branches of the plant by corresponding solenoid valves which must be powered and controlled; the equilibrium of the system is obtained by means of precise control of the valves.

DISCLOSURE OF THE INVENTION

In this context, the main aim of the invention is to overcome at least some of the above-mentioned drawbacks.

An aim of the invention is to provide a simple and inexpensive recirculation system which theoretically makes it possible to recover 100% of the hydrogen purged with the removal of the accumulations of water on the anode side of a fuel cell.

This aim is achieved by a recirculation system comprising the technical features described in one or more of the accompanying claims. The dependent claims correspond to possible different embodiments of the invention.

In accordance with a first aspect, the invention relates to a system for recirculating hydrogen for a fuel cell electricity generation system.

The recirculation system comprises a tank having an inlet which can be connected to an anode outlet for the water provided in the fuel cell and an outlet which can be connected to a line for supplying hydrogen to the fuel cell.

This system comprises a one-way check valve, which can be inserted between the anode outlet of the fuel cell and the tank inlet, for regulating a flow from the fuel cell to the tank. The valve is open at normal operating pressures of the generating system, in particular when a supply valve provided on the hydrogen feed line is open.

The supply valve puts the fuel cell in communication with a hydrogen source and, once opened, brings the plant, if necessary through a pressure reducer, to a predetermined working pressure, and supplies the hydrogen fuel cell.

The recirculation system comprises a one-way check valve, which can be inserted between the tank outlet and the hydrogen feed line, downstream of the feed valve, for adjusting a flow, in particular of hydrogen, from the tank to the hydrogen feed line.

In this way, when the hydrogen feed valve is open, the fuel cell and the tank are at the predetermined operating pressure and the one-way check valve between the fuel cell and the tank is open whilst the one between the tank and the feed line is closed.

In accordance with one aspect of this invention, in the case of a decrease in the performance of the fuel cell, caused for example by flooding, the supply valve is closed.

In this way, a negative pressure is triggered downstream both of the feed valve and of the one-way check valve between the tank and the feed line.

This negative pressure draws hydrogen from the tank, the one-way check valve between the tank and the feed line opens whilst the check valve between the fuel cell and the tank closes.

The hydrogen present in the tank feeds the fuel cell, consuming itself, thus resulting in a further drop in the pressure.

According to an aspect of the invention, if the pressure in the tank falls below a predetermined minimum value, mainly due to hydrogen consumption by the fuel cell, the feed valve opens.

A new flow for supplying hydrogen at the working pressure determines the opening of the check valve between the fuel cell and the tank and the closing of the check valve between the tank and the feed line. In order to be able to fill the tank again up to the working pressure, the hydrogen feed flow must be forced to firstly pass inside the stack on the anode side and will therefore naturally take away the excess water from the anode side.

The water removed from the anode side is then collected in the tank, in particular on bottom of it.

The pressure inside the fuel cell and in the tank will again reach the working pressure and all will proceed as described above until a new closing of the feed valve.

According to an aspect of the invention, the water accumulated in the tank can be removed from below without loss of hydrogen, for example by means of a suitable discharge valve.

BRIEF DESCRIPTION OF DRAWINGS

Further features and advantages of the invention are more apparent in the following non-limiting description of a preferred but non-exclusive embodiment of an electricity generation plant comprising a relative hydrogen recirculation system.

The description is set out below with reference to the accompanying drawing, provided solely for purposes of illustration without restricting the scope of the invention showing a block diagram of an electricity generating plant equipped with a hydrogen recirculation system in accordance with the invention.

DETAILED DESCRIPTION OF PREFERRED EMBODIMENTS OF THE INVENTION

With reference to the accompanying drawing, the numeral 100 denotes an electricity generating plant according to the invention and described only insofar as necessary for understanding the invention.

The plant 100 comprises a stack 101 of fuel cells formed, in known manner, by a plurality of suitably stacked basic fuel cells in which a reaction between hydrogen and oxygen occurs in known manner, which generates a flow of electrons and water vapour.

This description could also refer to a plant 100 comprising a single basic fuel cell given the similar operation of a basic fuel cell and a stack of basic fuel cells.

The stack has a first side 101a or an anode side, and a second side 101b, or cathode side.

The anode side 101a is the inlet side of a first reactant, in particular hydrogen, whilst the cathode side 101b is the inlet side of a second reactant, in particular air or oxygen, for the reaction which occurs in the stack 101.

As schematically illustrated, the anode side 101b has an inlet 102 for hydrogen and an outlet 103 for the hydrogen and for at least one by-product of the reaction which occurs in the stack 101.

The plant 100 comprises a line 104 for feeding hydrogen which provides, normally, to the stack 101, hydrogen at an operating or working pressure.

The line 104 leads to a feed system, schematically represented as a block 105, which supplies hydrogen to the line 104 at a predetermined pressure.

The plant 100 comprises a feed valve 106, preferably a solenoid valve, which intercepts the line 104 between the system 105 and the stack 101.

The pressure of the hydrogen is preferably adjusted to the operating pressure downstream of the valve 106 in a direction V for feeding hydrogen, for example by means of a pressure regulator schematically represented as a block 107.

The regulator 107 regulates the operating pressure to a value of, for example, between 1.20 bar and 1.75 bar; in one embodiment of the plant 100 the operating pressure may preferably be 1.45 bar.

In one preferred embodiment, the operating pressure is equal to 1.75 bar.

The plant 100 comprises a device for controlling the stack 101, schematically illustrated with a block 108, which monitors the correct operation of the stack 101.

The device 108 comprises, for example, a voltmeter for monitoring the voltage at the terminals of the stack 101 or a suitable system for measuring the voltages of each single cell constituting the stack 101.

The plant 100 comprises a recirculation system, and in particular an anode recirculation system, denoted in its entirety by the numeral 1.

Advantageously, the system 1 makes it possible not to disperse hydrogen, that is to say, to substantially keep the entire hydrogen in the plant 1.

The system 1 is also used to purge, that is, to expel, from the stack 101, any water in excess of that necessary for the operation of the plant 1 and which, flooding the stack itself, could adversely affect the operation.

The recirculation system 1 comprises a tank 2 having a recirculation inlet 3 and an outlet 4.

The inlet 3 is connectable, and connected, in the example illustrated, to the outlet 103 in the anode side 101a of the stack 101.

The system 1 comprises, in the example illustrated, a valve CV1 which places the outlet 103 and the inlet 3 in communication. The valve CV1 can be switched between an open position and a closed position.

The valve CV1 can be inserted, and is inserted in the example illustrated, between the outlet 103 of the stack 101 and the inlet of the tank 2, for adjusting a first flow F1 from the stack to the tank, in such a way that the tank 2 is in fluid communication with the stack 101 when the valve CV1 is open.

The valve CV1 is preferably of the one-way type and is open if the pressure upstream of the valve CV1 is greater than or equal to the working pressure, that is to say, if the pressure upstream of the valve CV1 is equal to 1.75 bar in the reference example.

The valve CV1 is, preferably, a so-called check or non-return valve, that is to say, an automatic valve which does not require any control and the operation of which is determined by the pressures upstream and downstream of it.

The valve CV1 lets the flow F1 pass when the pressure in the stack 101 is greater than that in the tank 2.

The outlet 4 of the tank 2 is connectable, and connected, in the example illustrated, to the feed line 104 downstream of the feed valve 106 in the hydrogen feed direction V.

The system 1 comprises, in the example illustrated, a second valve CV2 which places the outlet 4 of the tank 2 in communication with the feed line 104. The valve CV2 can be switched between an open position and a closed position.

The valve CV2 can be inserted, and is inserted in the example illustrated, between the outlet 4 of the tank 2 and the feed line 104, for adjusting a second flow F2 from the tank 2 to the feed line 104, in such a way that the tank 2 is in fluid communication with the line 104 when the valve CV2 is open.

The valve CV2 is preferably unidirectional and open if the pressure downstream of the valve CV2 is less than the operating pressure, that is to say, if the pressure downstream of the valve CV2 is less than 1.75 bar in the reference example.

The valve CV2 is, preferably, a so-called check or non-return valve, that is to say, an automatic valve which does not require any control and the operation of which is determined by the pressures upstream and downstream of it.

The valve CV2 lets the flow F2 pass when the pressure in the tank 2 is greater than that in the feed line 104.

Preferably, the tank 2 has a drainage outlet 5 positioned, in use, below the outlet 4, as illustrated schematically.

The recirculation system 1 preferably comprises a valve for controlling the outlet 5 or discharge, schematically represented as a block 6.

The valve 6 is, for example, a solenoid valve and can be controlled between an open configuration, wherein the outlet 5 is open and a closed configuration wherein the outlet 5 is closed for adjusting a flow of the by-product, in particular water, as described in more detail below, coming out from the tank 2 through the outlet 5.

The system 1 preferably comprises a level sensor, schematically represented as a block 7, for monitoring the level of the water in the tank 2.

Advantageously, the valve 6 is controlled as a function of the level of the water in the tank 2 as detected by the sensor 7.

In the embodiment illustrated, the tank 2 preferably has a vent outlet 8 positioned, in use, substantially at the same height as the recirculation outlet 4.

The recirculation system comprises a vent valve, schematically represented as a block 9, in communication with the outlet 8.

The valve 9 is, for example, a solenoid valve and can be controlled between an open configuration, wherein the outlet 8 is open and a closed configuration wherein the outlet 8 is closed to regulate any flow of gas present in the tank 2.

The recirculation system 1 comprises a pressure sensor, schematically illustrated with a block 10, for monitoring the pressure in the tank 2 which corresponds to the pressure in the plant 100 downstream of the valve 106 and in particular downstream of the regulator 107.

At steady-state conditions, under normal operating conditions, the sensor 10 measures the working or operating pressure, for example the above-mentioned 1.75 bar, which is maintained by the feed line 104.

The plant 100 preferably comprises a computerised command and control unit, schematically illustrated with a block 11, for controlling the plant 100.

The unit 11 is in communication with the supply valve 106 and is configured for closing the valve 106 at a drop in the performance of the stack 101, for example upon the occurrence of an instability of the voltage at the terminals of the stack.

Preferably, the unit 11 is in communication with the device 108 for controlling the stacks 101 and is configured to close the feed valve 106 if, for example, the voltage at the terminals of the stack 101 falls below a predetermined value or if the voltages of the cells of the stack are unbalanced.

In one embodiment, the unit 11 is configured for closing the supply valve 106 periodically, for example at 1 minute intervals or even at suitably designed irregular intervals.

As illustrated, the unit 11 is preferably in communication with the level sensor 7 and with the water discharge valve 6 and is configured to open the valve 6 as a function of the level of the water in the tank 2.

According to an embodiment, the valve 6 is controlled by an automatic system, preferably substantially mechanical such as, for example, a level gauge, that is, integrated in it.

The unit 11 is in communication with the pressure sensor 10, for monitoring, in particular, the pressure of the feed line 104 downstream of the valve 106.

The computerised unit 11 is configured for opening the feed valve 106 if the pressure in the stack 101 and in the tank 2, as monitored by the sensor 10, falls below a predetermined minimum value.

The unit 11 is in communication with the vent valve 9 for controlling the latter between the open and closed configurations.

According to an embodiment, the valve CV1 and/or the valve CV2 are solenoid valves and in communication with the computerised command and control unit 11 which is configured to operate the valve CV1 and/or the valve CV2.

In use, the feed valve 106 is opened at the starting of the plant 1 and the pressure downstream of it, both inside the stack 101 and inside the tank 2, is brought to the working or operating pressure, for example the above-mentioned 1.75 bar, for example by means of the pressure regulator 107; the operating pressure in the plant determines the opening of the valve CV1.

The valve CV1 opens automatically, without any external intervention, thanks to the pressure variation.

The pressure sensor 10 monitors the feed pressure, the valve 106 remains open and the pressure in the plant, downstream of the valve 106, always remains at the operating or working value.

At the same time, the feed line 104, by means of the valve 106, continuously restores the hydrogen consumed by the reaction in the stack 101 whilst the water starts to accumulate on the anode side of the fuel cell. When the water accumulated on the anode side reaches excessive values, highlighted, for example, by a decrease in the performance of the stack 101, detected by the device 108, a purging operation is started, by means of the unit 11, to prevent the flooding of the stack.

The computerised unit 11 imposes a closing of the feed valve 106.

In these conditions, the reaction in the stack 101 and the relative hydrogen consumption cause a negative pressure downstream of the valve 106.

This negative pressure determines a natural closing of the valve CV1 and a natural opening of the valve CV2, withdrawing hydrogen in the feed line 104 from the tank 2.

The hydrogen, in fact, being in the tank 2 at the working pressure, opens the check valve CV2 and the stack 101 is fed, on the anode side, by the hydrogen present in the tank 2.

Due to the reaction, the pressure in the tank 2 falls below the operating pressure, continuing to feed the stack 101.

Once the pressure reaches a predetermined minimum value, for example 1.25 bar, the unit 11 causes the valve 106 to open.

In one embodiment, the valve 106 may be directly controlled in voltage by a signal coming from the pressure sensor 10.

In an alternative embodiment, the closing and the opening of the valve 106 are carried out periodically, if necessary regardless of the pressure in the plant.

Once the valve 106 is open, a flow of hydrogen coming from the supply system 105 flows to the stack 101 and to the tank 2 also having a pressure jump which, in the example illustrated, is 500 mbar.

This flow of hydrogen conveys the excess water from the anode side of the stack 101 into the tank 2 and the pressure returns to the operating pressure.

The drained water accumulates on the bottom of the tank 2 remaining separate from hydrogen which, being lighter, accumulates at the top of the tank. The hydrogen present in the tank 2 at the operating pressure can, as described, feed the stack 101 when the feed valve 106 is closed.

The water discharge valve 6 may be operated, preferably using the computerised unit 11 or by a level gauge, to eliminate the water but without losing hydrogen which remains in the upper part of the tank 2.

The opening and the closing of the valve 6 are preferably controlled on the basis of the water level in the tank 2 as found by the level sensor 7.

In the example illustrated, if the water level exceeds, for example, a predetermined value, the unit 11 opens the valve 6.

The vent valve 9 is used, for example, to remove any traces of inert gases which accumulate at the anode.

Advantageously, it may be activated, preferably using the unit 11, with a significantly low or negligible frequency, preserving the efficiency of use of hydrogen.

The solution described brings important advantages.

The system recirculates hydrogen in a simple and natural manner without the need for any compressor or a sophisticated control system based on a multiplicity of solenoid valves.

The system also allows a purge of the anode water.

The components used have zero consumption or low consumption and do not adversely affect the efficiency of the plant.

The tank can collect the excess water removed from the anode side during normal operation of the fuel cell. The capacity of this tank is linked to the nominal power of the stack and, therefore, to its average hydrogen consumption.

The plant 100 with the recirculation system 1 can be interfaced, for example, with lithium battery packs and user loads.

In particular, a preferred application is for the power packs of lift trucks and similar systems, in which the fuel cell and lithium battery pack set constitutes an alternative to the traditional fully lead or lithium electric packs.

It should be understood that the device can also be used for the efficient and economical use of all hydrogen available in any storage system, whether it is pressurised, such as gas cylinders, or with different methods such as, but not exclusively, metallic hydrides and, also, in all those applications in which a fuel cell but also, more generally, any electricity generating system must be suitably connected to lithium battery packs in turn connected to user loads such as, for example, in stationary systems for generating and storing energy such as UPS and APS or in mobile systems such as electric vehicles with or without the use of any other electric power means between the fuel cell and the lithium battery pack.

The invention claimed is:

1. A hydrogen recirculation system for at least one basic fuel cell, having a first inlet side for a first reactant, hydrogen, and a second inlet side for a second reactant, said first inlet side including an inlet for the first reactant and an outlet for at least a first by-product, water, of a reaction which occurs in the at least one basic fuel cell,
   said recirculation system comprising a tank including an inlet configured to be connected to said outlet of the at least one basic fuel cell and a first outlet configured to be connected to a line for feeding said first reactant to the at least one basic fuel cell,
   said recirculation system comprising at least a first check valve, inserted between said outlet of the at least one basic fuel cell and said inlet of the tank, to allow or prevent a first flow from the outlet of the at least one basic fuel cell to the inlet of the tank and at least a second check valve, inserted between said outlet of the tank and the line for feeding the first reactant, to allow or prevent a second flow of the first reactant from the outlet of the tank to the line for feeding the first reactant,
   said first check valve being a one-way valve configured to:
      automatically open to allow the first flow from the outlet of the at least one basic fuel cell to the inlet of the tank when a pressure at the outlet of the at least one basic fuel cell is greater than a pressure at the inlet of the tank, and
      automatically close to prevent a flow between the outlet of the at least one basic fuel cell to the inlet of the tank when a pressure at the outlet of the at least one basic fuel cell is less than a pressure at the inlet of the tank, and
   said second check valve being a one-way check valve configured to:
      automatically open to allow the second flow form the tank to the line for feeding the first reactant when pressure at the outlet of the tank is greater than a pressure at the line for feeding the first reactant, and
      automatically close to prevent a flow between the outlet of the tank and the line for feeding the first reactant when pressure at the outlet of the tank is less than the pressure at the line for feeding the first reactant.

2. The recirculation system according to claim 1, wherein said tank includes a second outlet for at least said first by-product positioned, in use, below said first outlet.

3. The recirculation system according to claim 2, and further comprising a first valve in communication with said second outlet for regulating a flow of the first by-product from said tank through said second outlet.

4. The recirculation system according to claim 3, and further comprising a level sensor for monitoring a level of the first by-product in the tank, said first valve being controlled as a function of said level.

5. The recirculation system according to claim 1, wherein said tank has a third outlet for at least a possible second by-product of the reaction, positioned, in use, substantially at a same height as said first outlet, said recirculation system further comprising a second valve in communication with said third outlet for regulating a flow of the second by-product from said tank through said third outlet.

6. An electricity generating plant comprising:
   the recirculation system according to claim 1;
   a stack of fuel cells comprising a plurality of basic fuel cells each including a first inlet side for a first reactant and a second inlet side for a second reactant, said first inlet side including an inlet for the first reactant, hydrogen and an outlet for at least a first by-product, water, of a reaction which occurs in the stack of fuel cells;
   a feed line for feeding first reactant to the stack of fuel cells, a feed valve, which intercepts the feed line between a system for feeding the first reactant and the stack of fuel cells;
   wherein the inlet of the tank is in communication with said outlet of the stack of fuel cells through said first check valve, inserted between said outlet of the stack of fuel cells and said inlet of the tank, and wherein the first outlet of the tank is in communication with the line for feeding the first reactant, downstream of the feed valve according to the flow of the first reactant in the feed line, through said second check valve inserted between said first outlet of the tank and the feed line of the first reactant.

7. The electricity generating plant according to claim 6, wherein said first check valve is configured to allow the flow of the first by-product from the stack of fuel cells to the tank if a pressure upstream of the first check valve is greater than a pressure downstream of the first check valve.

8. The electricity generating plant according to claim 6, wherein said second check valve is configured to allow the flow of the first reactant from the tank to the feed line of the first reactant if a pressure upstream of the second check valve is greater than a pressure downstream of the second check valve.

9. The electricity generating plant according to claim 6, and further comprising a computerized command and control unit in communication with said feed valve and configured for closing said feed valve upon a drop in the performance of the stack of fuel cells.

10. The electricity generating plant according to claim 9, wherein the drop in the performance of the stack of fuel cells is an occurrence of an instability of a voltage at terminals of the stack of fuel cells.

11. The electricity generating plant according to claim 10, and further comprising a device for controlling the stack of fuel cells, said computerized command and control unit being configured for closing said feed valve if the voltage at the terminals of the stack of fuel cells falls below a predetermined value.

12. The electricity generating plant according to claim 9, and further comprising:
   wherein said tank includes a second outlet for at least said first by-product positioned, in use, below said first outlet;
   a first valve in communication with said second outlet for regulating a flow of the first by-product from said tank through said second outlet; and
   a level sensor for monitoring a level of the first by-product in the tank, said first valve being controlled as a function of said level;
   wherein said computerized command and control unit is in communication with said level sensor and is configured to open said first valve as a function of the level of the first by-product in the tank.

13. A process for recirculating an electricity generating plant comprising a stack of fuel cells having a first inlet side for a first reactant and a second inlet side for a second reactant, said first side including an inlet for a first reactant, hydrogen, and an outlet for at least a first by-product, said process comprising the steps of:

putting in communication the inlet of the first reactant with a line for feeding the reactant using a feed valve, feeding the first reactant to the stack of fuel cells and keeping the stack of fuel cells at a working pressure;

putting in communication the outlet of the stack of fuel cells with a tank using a first check valve which allows a flow of said first by-product from the stack of fuel cells to the tank;

the first check valve being a one-way valve configured to:
automatically open to to allow the flow of the first sub-product from the stack of fuel cells to the tank if the pressure at the outlet of the stack of fuel cells is greater than a pressure at the tank, and
automatically close to prevent a flow between the outlet of the stack of fuel cells and the tank when the pressure at the outlet of the stack of fuel cells is less than the pressure at the tank, a pressure in the tank adapting to the working pressure;

putting the tank in communication with the feed line, downstream of the feed valve and upstream of the stack of fuel cells, via a second check valve which is configured to:
automatically open to allow a flow of gas from the tank to the feed line when a pressure at the tank is greater than a pressure at the feed line, and
automatically close to prevent a flow between the tank and the feed line when the pressure at the of the tank is less than the pressure at the feed line, interrupting the feeding of the first reactant to the stack of fuel cells, closing the feed valve, in the presence of excessive water in the first inlet side of the stack of fuel cells, the interrupting of the feed determining a negative pressure upstream of the first check valve and downstream of the second check valve, said negative pressure determining a closing of the first check valve and an opening of the second check valve such that the second reactant, compressed in the tank, feeds the stack of fuel cells, said second reactant coming from the tank being consumed until reaching a minimum predetermined pressure value;

after the step of interrupting the feeding of the first reactant, a step of opening the feed valve when the predetermined minimum pressure value is reached in the tank determining an overpressure in the feed line downstream of the feed valve, the overpressure in the feed line of the first reactant pushing, via the first reactant, the reaction by-product, water, present in the stack of fuel cells towards the tank.

14. The recirculation process according to claim 13, and further comprising a step of emptying the tank of the reaction by-product, when a maximum level of the by-product in the tank is reached.

15. The recirculation process according to claim 13, wherein said steps of interrupting the feeding of the first reactant to the stack of fuel cells, and subsequently, opening the feed valve, are performed periodically at predetermined time intervals even regardless of the pressure values in the system.

16. The recirculation process according to claim 13, wherein the interrupting the feeding of the first reactant to the stack of fuel cells occurs if a voltage at terminals of the stack of fuel cells decays beyond a predetermined value.

* * * * *